United States Patent [19]
Cheesman et al.

[11] Patent Number: 5,222,920
[45] Date of Patent: Jun. 29, 1993

[54] CHAIN INCLUDING ROLLER SEALING ARRANGEMENT

[75] Inventors: Robert R. Cheesman, Waukesha; Russell H. C. Uttke, Greendale, both of Wis.

[73] Assignee: Rexnord Corporation, Milwaukee, Wis.

[21] Appl. No.: 893,753

[22] Filed: Jun. 5, 1992

[51] Int. Cl.⁵ .............................................. F16G 13/04
[52] U.S. Cl. ..................................... 474/213; 474/231
[58] Field of Search ............... 474/206, 209, 212, 226, 474/230-232, 156, 157, 213

[56] References Cited

U.S. PATENT DOCUMENTS

| | | | |
|---|---|---|---|
| 2,336,913 | 12/1943 | Albrecht | 74/257 |
| 2,389,874 | 11/1945 | Searles et al. | 74/251 |
| 2,411,207 | 11/1946 | Hait | 74/257 |
| 2,906,562 | 9/1959 | Burgman | 305/10 |
| 3,050,346 | 8/1962 | Simpson | 474/230 X |
| 3,135,128 | 6/1964 | Rudolph | 74/255 |
| 3,244,457 | 4/1966 | Ross | 305/11 |
| 3,336,089 | 8/1967 | Krickler | 305/11 |
| 3,358,524 | 12/1967 | Patrignani | 474/231 X |
| 3,390,922 | 7/1968 | Reinsma | 474/230 X |
| 3,425,754 | 2/1969 | Artman | 474/230 X |
| 3,447,837 | 6/1969 | Deli et al. | 305/11 |
| 3,451,727 | 6/1969 | Deli et al. | 305/17 |
| 3,850,804 | 11/1974 | Taylor et al. | 210/155 |
| 3,868,324 | 2/1975 | Taylor et al. | 210/158 |
| 4,094,515 | 6/1978 | Araya et al. | 277/92 |
| 4,424,050 | 1/1984 | Sato | 474/231 |
| 4,428,739 | 1/1984 | Shimano | 474/231 |
| 4,464,151 | 8/1984 | Kahl | 474/231 |
| 4,494,945 | 1/1985 | Ogino | 474/231 |
| 4,582,601 | 4/1986 | Strow et al. | 210/161 |
| 4,612,869 | 9/1986 | Poppe | 114/293 |
| 4,615,171 | 10/1986 | Burk | 59/78 |
| 4,729,754 | 3/1988 | Thuerman | 474/207 |
| 4,795,408 | 1/1989 | Kotegawa et al. | 474/209 |
| 4,995,852 | 2/1991 | Takahashi et al. | 474/91 |

Primary Examiner—Ramon S. Britts
Assistant Examiner—Roger J. Schoeppel
Attorney, Agent, or Firm—Michael, Best & Friedrich

[57] ABSTRACT

A chain equipped with rollers and including roller joint sealing arrangements each comprising the provision of complementary sets of annular grooves in the end faces of a roller and in the inwardly facing surfaces of the sidebars of the roller chain. An annular seal member is loosely seated in each complementary set of grooves to form a labyrinth type seal to prevent lubricant efflux from the roller joint and contaminant influx into the roller joint to improve the wear characteristics of the roller joint.

22 Claims, 2 Drawing Sheets

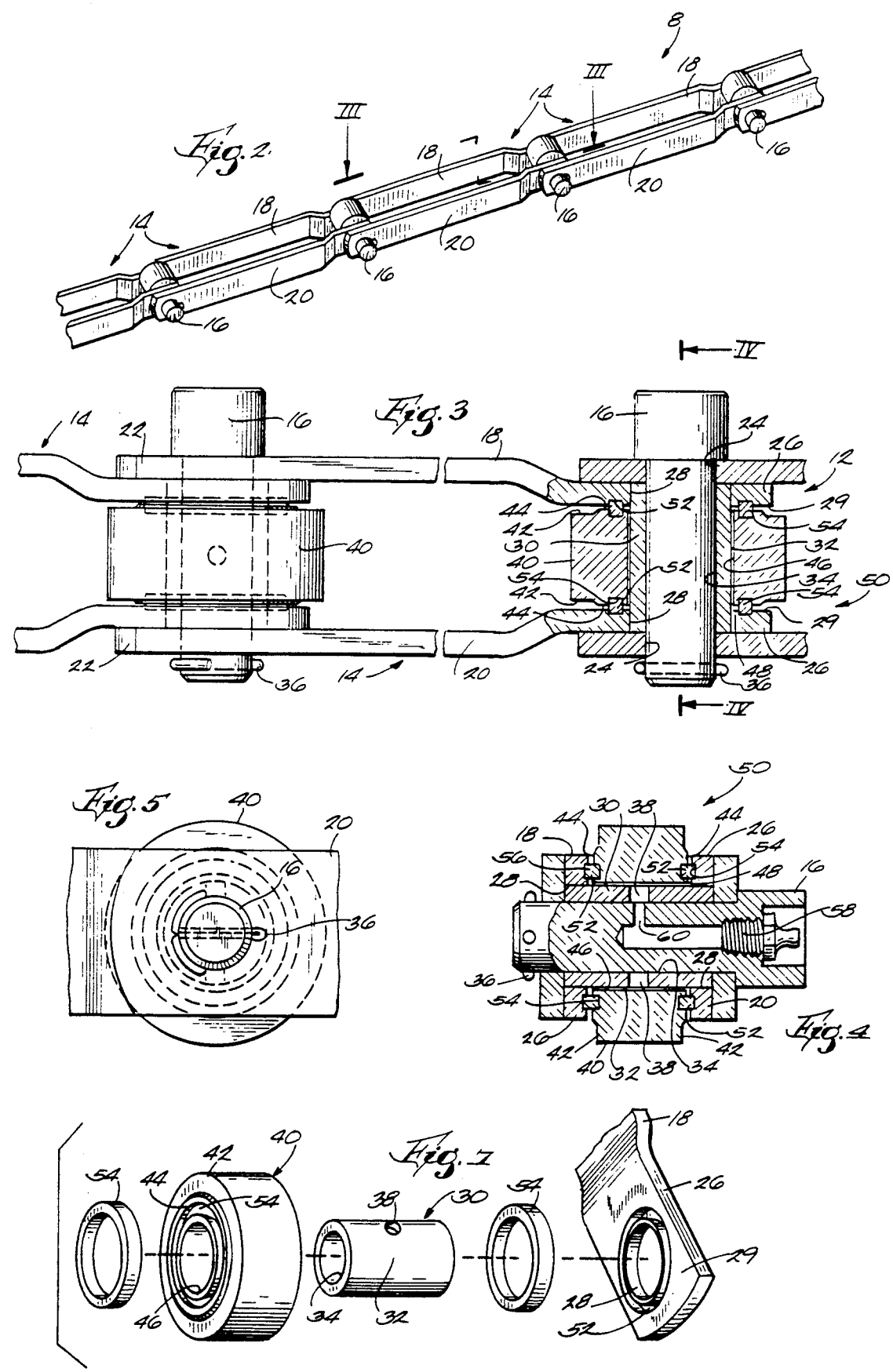

CHAIN INCLUDING ROLLER SEALING ARRANGEMENT

BACKGROUND OF THE INVENTION

1. Field of the Invention

The invention relates generally to chains including rollers, and more particularly to a roller joint sealing arrangement which can be used in a chain including rollers to seal the roller joint against lubricant efflux and/or contaminant influx.

2. Reference to Prior Art

In chains with rollers that operate in potentially corrosive or damaging environments such as the environment in which traveling water screens operate, it is often desirable to protect the chain joints and particularly each roller joint from wear. As used herein the term "roller joint" will refer to the wear surface between the inner diameter surface of a chain roller and the peripheral surface of the bushing on which the roller is mounted. In traveling water screen applications a pair of chains equipped with rollers support a plurality of baskets therebetween. The chains are continuously driven along guide rails into and out of the water in an endless loop so that the baskets filter fish and debris from a water inflow. Protection against wear of the rollers and bushings can be achieved by maintaining lubricant in the roller joints.

In the past, rollers incorporated into the chains used in traveling water screen applications experienced unacceptable wear rates due to lubricant loss from the roller joints and/or entry of contaminants into the roller joints. In extreme cases, wear on the inner diameter bearing surface of a roller can result in impingement of the chain sidebars on the guide rail along which the chain travels. The rollers used in travelling water screens are sometimes made of a metal alloy high in nickel content such as monel and can be very expensive to replace. Additionally, chains used in traveling water screens include a large number of rollers and replacement of these rollers involves lengthy water screen downtime.

Chains which employ annular seals to protect joints between chain pins and chain bushings are generally well known. Examples of such chains are provided in U.S. Pat. No. 4,424,050, issued Jan. 3, 1984 to Sato and U.S. Pat. No. 4,464,151, issued Aug. 7, 1984 to Kahl.

In chains of the type which include double outer links pivotally connected to a single center link by a bushing and a pin, it is known to seat annular sealing devices in corresponding annular grooves in the center link and the outer links. This is intended to protect the joint between the bushing and the center link from dirt and grit. An example of such a chain is disclosed in U.S. Pat. No. 2,389,874, issued Nov. 27, 1945 to Searles et al.

Additionally, U.S. Pat. No. 4,795,408 discloses a roller chain link having a roller with open opposite end faces and thrust rings which are intended to fit within the open end faces to seal lubricant in the space between the roller and the bushing.

SUMMARY OF THE INVENTION

The present invention provides an improved chain for use in applications such as traveling water screens, the chain including an improved sealing arrangement for the joints between the chain rollers and bushings to retain lubricant in the roller joint and to exclude contaminants from the roller joint. The roller joint sealing arrangement of the present invention was developed to improve roller joint wear life and produces a chain having a substantially improved wear life when used in a traveling water screen.

In one form of the invention the roller joint sealing arrangement includes the provision of complementary sets of annular grooves in the end faces of a roller and in the inwardly facing surfaces of the sidebars of a chain. An annular seal member is loosely seated in each complementary set of grooves to form a labyrinth-type seal to prevent or reduce lubricant efflux from the roller joint and contaminant influx into the roller joint to improve the wear characteristics of the roller joint.

More specifically, the invention provides a chain comprising a plurality of chain link assemblies and chain pins for articulateably interconnecting adjacent chain link assemblies, each of the chain link assemblies including a pair of spaced apart sidebars, each of the sidebars including an inwardly facing surface, the inwardly facing surfaces of the sidebars being in opposed relation to one another, a bushing extending laterally between the inwardly facing surfaces of the sidebars, the bushing including an outer surface and an axially extending bore adapted to receive one of the chain pins to interconnect the chain link assembly to an adjacent chain link assembly, a roller rotatably supported on the outer surface of the bushing and between the inwardly facing surfaces of the sidebars, the roller including opposite end faces and an inner surface, the inner surface of the roller and the outer surface of the bushing defining therebetween a clearance space, and a pair of annular seal members for sealing the clearance space, each of the seal members surrounding the bushing and being positioned between one of the end faces of the roller and the inwardly facing surface of one of the sidebars.

The invention also provides a chain comprising a plurality of chain link assemblies and chain pins for articulateably interconnecting adjacent chain link assemblies, each of the chain link assemblies including a pair of spaced apart sidebars, each of the sidebars including an inwardly facing surface, the inwardly facing surfaces of the sidebars being in opposed relation to one another, a bushing extending laterally between the inwardly facing surfaces of the sidebars and interconnecting the sidebars, the bushing including an outer surface and an axial bore adapted to receive a chain pin, a roller rotatably supported on the outer surface of the bushing and between the inwardly facing surfaces of the sidebars, the roller including opposite end faces, each of the end faces including an annular groove surrounding the bushing, and the roller including an inner surface, the inner surface of the roller and the outer surface of the bushing defining therebetween a clearance space, and a pair of annular seal members, each of the annular seal members being seated in one of the annular grooves in the roller to seal the clearance space.

The invention further provides a chain comprising a plurality of chain link assemblies and chain pins for articulateably interconnecting adjacent chain link assemblies, each of the chain link assemblies including a pair of spaced apart sidebars, each of the sidebars including an inwardly facing surface, the inwardly facing surfaces of the sidebars being in opposed relation to one another, a bushing extending laterally between the inwardly facing surfaces of the sidebars and interconnecting the sidebars, the bushing including an outer surface and an axial bore adapted to receive a chain pin, a roller rotatably supported on the outer surface of the bushing and between the inwardly facing surfaces of the sidebars, the roller including opposite first and second end faces, each of the end faces being in opposed relation to the inwardly facing surface one of the sidebars, and the roller including an inner surface, the inner surface of the roller and the outer surface of the bushing defining therebetween a clearance space, and a sealing arrangement including a pair of annular grooves, each of the annular grooves circumscribing the bushing, one of the annular grooves being located in one of the first end face and the inwardly facing surface opposing the first end face, and the other of said annular grooves being located in the second end face and the inwardly facing surface opposing the second end face, and the sealing arrangement including pair of annular seal members, each of the annular seal members being seated in one of the annular grooves to seal the clearance space.

Other features and advantages of the invention will become apparent to those skilled in the art upon review of the following detailed description, claims and drawings.

BRIEF DESCRIPTION OF THE DRAWINGS

FIG. 2 is a perspective view of a segment of the chain illustrated in FIG. 1 and employing chain link assemblies equipped with sealed roller joints.

FIG. 3 is an enlarged top view taken along line III—III in FIG. 2, and showing a roller joint sealing arrangement.

FIG. 4 is a cross-sectional view taken along line IV—IV in FIG. 3.

FIG. 5 is a side elevational view of a portion of the chain illustrated in FIG. 3.

FIG. 7 is an exploded perspective view showing some of the components forming the roller joint sealing arrangement illustrated in FIG. 3.

Figure 1:
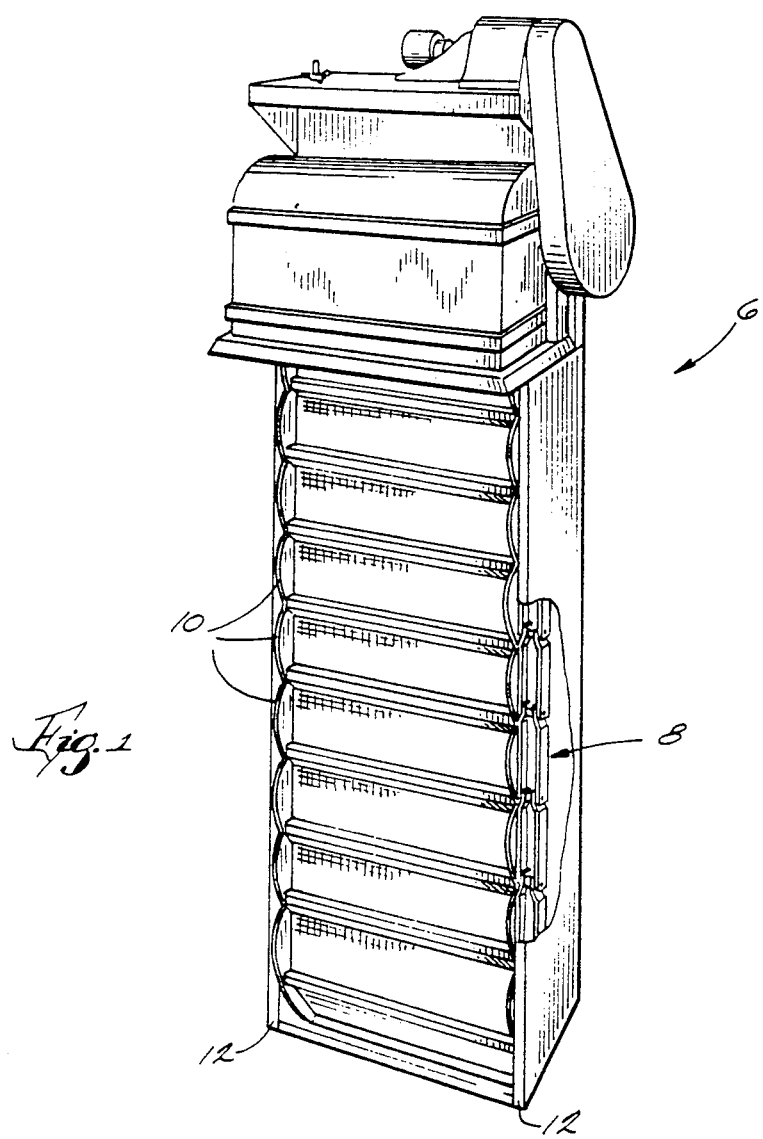
FIG. 1 is a perspective view of a traveling water screen with a portion broken away to reveal a chain embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Illustrated in FIG. 1 is a traveling water screen 6 that can be placed in a water inflow channel (not shown) and that includes a pair of chains 8 (only one is shown) embodying the invention. The chains 8 are trained over sprockets (not shown) mounted at the top and the bottom of the traveling water screen 6 and have mounted therebetween a plurality of baskets 10. In operation, the chains 8 are driven along a guide rail 12 to transport the baskets 10 in a continuous loop into and out of the water to filter fish and debris therefrom. While the chains 8 are preferably of the type used in a traveling water screen application, it should be understood that the chain 8 described below can be adapted for use in many various applications.

Illustrated in FIG. 2 is a segment of one of the chains 8, this chain 8 including a plurality of chain link assemblies 14 which are articulateably interconnected by chain pins 16, as is more fully explained hereinafter. More specifically, as shown in FIG. 3, each chain link assembly 14 comprises a pair of corresponding, spaced apart and substantially identical sidebars 18 and 20 oriented in oppositely disposed, generally parallel relation to each other. Although the sidebars 18 and 20 can have various configurations, in the illustrated arrangement the sidebars 18 and 20 each consist of an integral, elongated piece including a first or outer end portion 22 having therein a pin hole 24 in the distal end thereof and a second or inwardly offset end portion 26. The inwardly offset end portions 26 of the sidebars 18 and 20 each has therein a bushing receiving aperture 28 and includes an inwardly facing surface portion 29, the inwardly facing surface portions 29 being in opposed relation to one another. As shown in FIGS. 2 and 3, the inwardly offset end portions 26 of the sidebars 18 and 20 of each chain link assembly 14 fit between the distal ends of the outer end portions 22 of the sidebars 18 and 20 of an adjacent chain link assembly. As shown in FIGS. 3 and 4, each chain link assembly 14 also comprises a tubular bushing 30 extending laterally between the sidebars 18 and 20. The opposite end portions of the bushing 30 are preferably press-fit into the apertures 28 in the inwardly offset end portions 26 of the sidebars 18 and 20 to secure the bushing 30 to the sidebars and to interconnect the sidebars 18 and 20. The bushing 30 includes an outer peripheral bearing surface 32 and an axial bore 34 for receiving one of the chain pins 16 to interconnect adjacent chain link assemblies 14. More particularly, a chain pin 16 extends through the bushing 30 in one chain link assembly 14 and through the pin holes 24 in the sidebars 18 and 20 of an adjacent chain link assembly 14 to interconnect these two chain link assemblies. A cotter pin 36 or other suitable means is used to prevent the removal of the chain pin 16. The bushing 30 is also provided with diametrically opposed, radially extending passageways 38 (see FIG. 4), the purpose of which will be further explained below.

To support the chain 8 for movement along one of the guide rails 12, each chain link assembly 14 also includes a roller 40 that is adapted to roll along the guide rail 12 or other structure. While in other arrangements the roller 40 could be mounted directly on the outer surface of a chain pin 16 or other cylindrical member, in the illustrated arrangement the roller 40 is rotatably mounted on the bushing 30. The roller 40 is located between the sidebars 18 and 20 and includes opposite radial end faces 42 which each have a slightly raised land or contact area 44 that is oriented in closely adjacent, opposed relation to the inwardly facing surface portion 29 of one of the sidebars 18 and 20.

Figure 6:
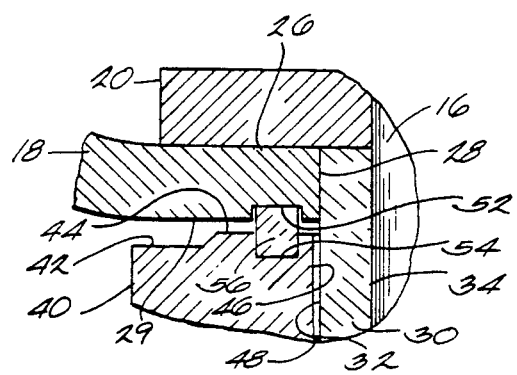
FIG. 6 is an enlarged view of a portion of the roller joint sealing arrangement illustrated in FIG. 3.

The roller 40 also includes an inner cylindrical bearing surface 46 in sliding, bearing engagement with the outer bearing surface 32 of the bushing 30. While in some arrangements the interface or joint between the roller 40 and the bushing 30 can be provided with a bearing unit such as a ball or roller bearing, in the illustrated arrangement the roller joint is formed by the inner bearing surface 46 of the roller 40 and the outer bearing surface 32 of the bushing 30. To reduce sliding friction between the roller 40 and the bushing 30 a lubricant, such as grease for example, is provided in the clearance space 48 (see FIG. 6) defined between the inner bearing surface 46 of the roller 40 and the outer bearing surface 32 of the bushing 30.

One aspect of the present invention is the recognition that the loss of lubricant from the roller joint and the entry of contaminants into the roller joint contribute significantly to roller joint wear, and particularly to wear on the inner bearing surface 46 of the roller 40. In traveling water screen applications grease can be flushed from the roller joints, and the roller joints are not uncommonly contaminated with debris from the water. This can lead to degraded performance of the chain 8 and the need for premature roller replacement which can involve considerable expense. Frequent periodic greasing or cleaning of the roller joints is generally not satisfactory to counter the effects of lubricant loss and contamination since these activities are labor intensive and can result in costly traveling water screen downtime.

Accordingly, each of the chain link assemblies 14 also comprises a roller joint sealing arrangement 50 to improve the wear characteristics of the roller joint by retaining lubricant in the clearance space 48 and by providing a barrier to contaminant influx into the roller joint. More specifically, and as shown in FIGS. 3 and 4, the roller joint sealing arrangement 50 provides an annular groove in the inwardly facing surface portion 29 of each of the sidebars 18 and 20. Each of these annular grooves is preferably in the form of a shallow ring-like depression 52 on the order of several one hundredths of an inch thick. Each of the depressions 52 is located in the inwardly offset end portion 26 of one of the sidebars 18 and 20 and completely surrounds and is concentric with the aperture 28 in that inwardly offset end portion 26 (see FIG. 7). The depressions 52 are preferably formed by coining each of the sidebars 18 and 20 as an integral part of the sidebar manufacturing operation. While the depressions 52 could formed by machining, coining is considered a more economical alternative.

Each roller joint sealing arrangement 50 also provides an annular groove 54 in each of the end faces 42 of the roller 40. The annular grooves 54 in the roller 40 are generally ring-like (see FIG. 7) and circumscribe the bushing 30. Also, each of the annular grooves 54 is located so as to be in registry with the depression 52 in one of the sidebars 18 and 20 to form a complementary set of grooves 52 and 54. The annular grooves 54 in the roller 40 each have an axial depth which is greater than the axial depth of the complementary depression 52 and which is preferably about fifteen one hundredths of an inch deep. Each roller joint seal arrangement 50 also includes a pair of annular seal devices or members 56 each positioned between one of the end faces 42 of the roller 40 and the inwardly facing surface portion 29 of one of the sidebars 18 and 20 and each seated in one of the sets of complementary grooves 52 and 54. The annular seal members 56 are preferably metallic washers, although seal members made of other materials could also be used.

Each seal member 56 cooperates with the set of complementary grooves 52 and 54 in which it is seated to form a labyrinth type sealing arrangement for the roller joint. The seal members 56 are preferably sized to accomplish the desired seal against contaminant influx and lubricant efflux while not interfering to an appreciable degree with the free rotation of the roller 40 on the bushing 30. In this respect, each seal member 56 preferably fits somewhat loosely into one of the sets of complementary groves 52 and 54. More specifically, each seal member 56 has a thickness dimension that is substantially greater than the maximum clearance between the end faces 42 of the roller 40 and the inwardly facing surface portions 29 of the sidebars 18 and 20, but that is less than the axial depth of the generally annular cavity defined by the set of complementary grooves 52 and 54 in which the seal member 56 is seated. Additionally, the outer diameter of each seal member 56 is preferably at least several one hundredths of an inch less than the outer diameter of each of the grooves 52 and 54, and the inner diameter of each seal member 56 is preferably several one hundredths of an inch greater than the inner diameter of the annular groove 54 in the roller 40. In the preferred form of the invention each of the annular seal members 56 is about 3/16 of an inch thick and has inner and outer diameters of about 2.4 inches and 2 inches, respectively. Thus, the annular seal members 56 are held within the sets of complementary grooves 52 and 54 so as to remain in generally concentric relation about the bushing 30 and are not removable from the grooves 52 and 54 without disassembly of the chain link assembly 14.

Although the need for periodic lubrication of the roller joints is reduced or eliminated by the incorporation of roller joint seal arrangements 50 into the chain 8, it may still be desirable to relubricate the roller joints between more extended intervals of time to provide added protection against roller joint wear. Accordingly, means are provided to facilitate injecting lubricant into the clearance space 48 between the roller 40 and the bushing 30. While various means for facilitating lubricant injection can be employed, in the illustrated construction such means includes the provision of chain pins 16 which are generally hollow (see FIG. 4) and which each include a removable grease fitting 58 and a lubricant passageway 60 that communicates with the clearance space 48 by way of the passageways 38 in the bushing 30. To relubricate a roller joint, lubricant is injected into the chain pin 16 through the grease fitting 58.

Each chain link assembly 14 can also be provided with hardware (not shown) to facilitate fastening the baskets 10 to the chain 8. An examples of suitable hardware and its attachment to a chain link assembly is illustrated in U.S. Pat. No. 4,852,601 issued Apr. 15, 1986 to Strow et al. and will not be further explained herein.

Advantageously, the roller joint seal arrangements 50 provide simple, durable roller joint seals that reduce chain maintenance and that guard against degradation of roller chain performance brought about by excessive roller wear. The roller joint seal arrangements 50 accomplish this by deterring lubricant efflux from the roller joints and contaminant influx into the roller joints to effectively improve the wear characteristics of the roller joints. This results in less frequent roller replacement and the need for less frequent or no periodic lubrication of the roller joints.

Other features and advantages of the invention are set forth in the following claims.

We claim:
1. A chain comprising:
a plurality of chain link assemblies and chain pins for articulateably interconnecting adjacent chain link assemblies, each of said chain link assemblies including
a pair of spaced apart sidebars, each of said sidebars including a first end portion and a second end por- tion offset inwardly with respect to said first end portion, said second end portions of said sidebars fitting between the first end portions of the sidebars of an adjacent chain link assembly, each of said second end portions having an inwardly facing surface, said inwardly facing surfaces of said sidebars being in opposed relation to one another, and each of said inwardly facing surfaces including an annular groove;

a bushing extending laterally between said inwardly facing surfaces of said sidebars, said bushing including an outer surface and an axially extending bore adapted to receive one of the chain pins, said annular grooves circumscribing said bushing;

a roller rotatably supported on said outer surface of said bushing and between said inwardly facing surfaces of said sidebars, said roller including opposite end faces, and an inner surface defining an axial bore receiving said bushing, said inner surface of said roller and said outer surface of said bushing defining therebetween a clearance space; and a pair of annular seal members for sealing said clearance space, each of said seal members surrounding said bushing and being positioned between one of said end faces of said roller and said inwardly facing surface of one of said sidebars, each of said seal members being seated in one of said annular grooves.

2. A chain as set forth in claim 1 wherein each of said seal members is a metallic washer.

3. A chain as set forth in claim 1 wherein each of said end faces of said roller includes an annular groove circumscribing said bushing, and wherein each of said seal members is seated in one of said annular grooves in said end faces.

4. A chain as set forth in claim 1 wherein each of said seal members has a thickness, and wherein each of said annular grooves in said inwardly facing surfaces has an axial extend which is less than the thickness of the seal member seated therein.

5. A chain as set forth in claim 1 wherein each of said annular grooves in said inwardly facing surfaces of said sidebars is a shallow ring-like depression.

6. A chain as set forth in claim 1 wherein each of said inwardly facing surfaces of said sidebars is coined to form an annular depression which defines the annular groove therein.

7. A chain as set forth in claim 1 wherein each of said end faces of said roller includes an annular groove circumscribing said bushing, wherein each one of said annular grooves in said end faces of said roller is in registry with the annular groove in one of said inwardly facing surfaces of said sidebars to form a set of complementary grooves, and wherein each of said seal members is seated in one of said sets of complementary annular grooves.

8. A chain as set forth in claim 7 wherein each of said seal members fits loosely in one of said sets of complementary annular grooves.

9. A chain as set froth in claim 7 wherein each of said seal members has a thickness, and wherein each of said annular grooves in said inwardly facing surfaces and each of said annular grooves in said roller has an axial extend, the combined axial extent of the complementary annular grooves being less than the thickness of the annular seal member seated therein.

10. A chain as set forth in claim 1 wherein said inner surface of said roller is in bearing engagement with said outer surface of said bushing, said inner surface of said roller, said outer surface of said bushing and said clearance space forming the roller joint, and wherein said clearance space is adapted to receive a lubricant.

11. A chain comprising:
a plurality of chain link assemblies and chain pins for articulateably interconnecting adjacent chain link assemblies, each of said chain link assemblies including a pair of spaced apart sidebars, each of said sidebars including an inwardly facing surface, said inwardly facing surfaces of said sidebars being in opposed relation to one another;

a bushing extending laterally between said inwardly facing surfaces of said sidebars and interconnecting said sidebars, said bushing including an outer surface and an axial bore adapted to receive a chain pin;

a roller rotatably supported on said outer surface of said bushing and between said inwardly facing surfaces of said sidebars, said roller including opposite end faces, each of said end faces including an annular groove, and said roller including an inner surface, said inner surface defining an axial bore in said roller for receiving said bushing, said annular groove surrounding said axial bore in said roller, and said inner surface of said roller and said outer surface of said bushing defining therebetween a clearance space; and a pair of annular seal members, each of said annular seal members being seated in one of said annular grooves in said roller to seal said clearance space.

12. A chain as set forth in claim 11 wherein each of said inwardly facing surfaces of said sidebars includes an annular groove surrounding said bushing and complementing one of said annular grooves in said roller, and wherein each of said annular seal members is seated in one of said annular grooves in said roller and in the complementary annular groove in one of said inwardly facing surfaces.

13. A chain as set forth in claim 12 wherein each of said annular seal members is a washer, and wherein each of said washers fits loosely between one of said end faces of said roller and one of said inwardly facing surfaces of said sidebars.

14. A chain as set forth in claim 11 wherein each of said inwardly facing surfaces of said sidebars is coined to form an annular depression surrounding said bushing, and wherein each of said seal members is seated between one of said annular grooves in said roller and one of said annular depressions in said inwardly facing surfaces of said sidebars.

15. A chain as set forth in claim 11 wherein said inner surface of said roller is in bearing engagement with said outer surface of said bushing, and wherein said clearance space is adapted to receive a lubricant.

16. A chain as set forth in claim 11 wherein each of said seal members has a thickness, and wherein each of said annular grooves in said roller has an axial extent which is less than the thickness of the annular seal member seated therein.

17. A chain comprising:
a plurality of chain link assemblies and chain pins for articulateably interconnecting adjacent chain link assemblies, each of said chain link assemblies including a pair of spaced apart sidebars, each of said sidebars including an inwardly facing surface, said inwardly facing surfaces of said sidebars being in opposed relation to one another;

a bushing extending laterally between said inwardly facing surfaces of said sidebars and interconnecting said sidebars, said bushing including an outer surface and an axial bore adapted to receive a chain pin;

a roller rotatably supported on said outer surface of said bushing and between said inwardly facing surfaces of said sidebars, said roller including opposite first and second end faces, each of said end faces being in opposed relation to the inwardly facing surface of one of said sidebars, and said roller including an inner surface, said inner surface defining an axial bore in said roller for receiving said bushing, and said inner surface of said roller and said outer surface of said bushing defining therebetween a clearance space; and a sealing arrangement including a pair of annular grooves, each of said annular grooves circumscribing said axial bore in said roller, one of said annular grooves being located in one of said first end face and the inwardly facing surface opposing said first end face, and the other of said annular grooves being located in one of said second end face and the inwardly facing surface opposing said second end face, and said sealing arrangement including pair of annular seal members, each of said annular seal members being seated in one of said annular grooves to seal said clearance space.

18. A chain as set forth in claim 17 wherein each of said inwardly facing surfaces includes one of said annular grooves, and wherein each of said seal members is engageable with one of said first and second end faces of said roller.

19. A chain as set forth in claim 18 wherein each of said first and second end faces of said roller includes an annular groove circumscribing said bushing and complementing the annular groove in the opposing one of said inwardly facing surfaces of said sidebars, and wherein each of said annular seal members is seated in one of said annular grooves in one of said inwardly facing surfaces of said sidebars and in the complementary one of said annular grooves in said end faces of said roller.

20. A chain as set forth in claim 18 wherein each of said annular grooves in said inwardly facing surfaces of said sidebars is a shallow annular depression.

21. A chain as set forth in claim 20 wherein each of said inwardly facing surfaces of said sidebars is coined to form said shallow annular depressions.

22. A chain as set forth in claim 17 wherein each of said seal members has a thickness, and wherein each of said annular grooves has an axial extent which is less than the thickness of the seal member seated therein.

* * * * *

UNITED STATES PATENT AND TRADEMARK OFFICE
CERTIFICATE OF CORRECTION

PATENT NO. : 5,222,920
DATED : June 29, 1993
INVENTOR(S) : Robert R. Cheesman

It is certified that error appears in the above-identified patent and that said Letters Patent is hereby corrected as shown below:

Title page,
Item [73], Assignee, "Rexnord Corporation Milwaukee WI." should read
-- Rexnord Corporation and Envirex, Inc., Milwaukee, WI. --

Signed and Sealed this

Twenty-ninth Day of June, 2004

JON W. DUDAS
*Acting Director of the United States Patent and Trademark Office*